F. T. FAY.

GATE.

APPLICATION FILED DEC. 5, 1919.

1,355,953. Patented Oct. 19, 1920.

Inventor

Frank T. Fay,

Witness

Chas. L. Griesbauer

By [signature]

Attorney

UNITED STATES PATENT OFFICE.

FRANK T. FAY, OF WOODHULL, ILLINOIS.

GATE.

1,355,953. Specification of Letters Patent. Patented Oct. 19, 1920.

Application filed December 5, 1919. Serial No. 342,649.

*To all whom it may concern:*

Be it known that I, Frank T. Fay, a citizen of the United States, residing at Woodhull, in the county of Henry and State of Illinois, have invented certain new and useful Improvements in Gates, of which the following is a specification.

This invention relates to gates and has special reference to an improvement in gates for stock inclosures and other farming uses.

A primary object of the invention is to provide a gate which automatically becomes locked with the gate post when lowered into line with the fence, and which may be released from its locked engagement in a simple and expeditious manner by elevating or lifting one end thereof. In this connection it is proposed to employ a novel tensioning or counterbalancing device which will offset the weight of the gate and hold the same in raised position whereby it will be free to swing over the ground and at the same time clear the gate post.

A further object of the invention is to provide a gate which involves a minimum use of metal parts thereby reducing the total weight of the gate and at the same time simplifying its manipulation.

With the above and other objects in view which will more readily appear as the nature of the invention is better understood the same consists in the novel construction, combination and arrangement of parts hereinafter more fully described, illustrated and claimed.

A preferred and practical embodiment of the invention is shown in the accompanying drawings, in which.

Similar references designate corresponding parts throughout the several figures of the drawings.

Figure 1:
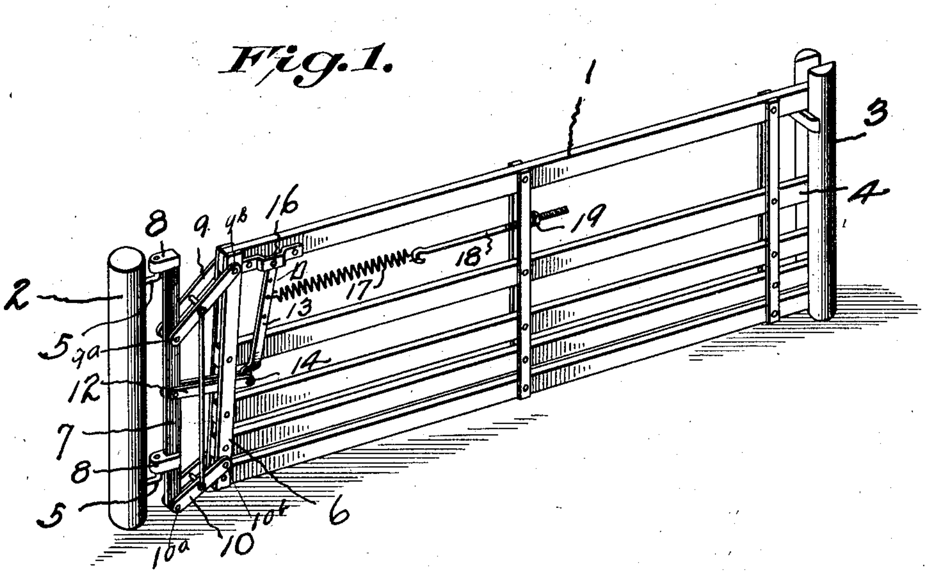
Figure 1 is a perspective view of the gate in its locked position.

In carrying my invention into effect I propose to utilize a gate 1 which may be of any desired construction to suit the required purpose, and preferably arranged between the opposite gate posts 2 and 3, the latter being constructed to receive the end 4 of the gate whereby it may be held locked in its closed position while the former may be provided with the supporting hooks 5 or their equivalent for receiving the combined supporting and operating unit carried by the end 6 of the gate.

This supporting and operating unit preferably consists of a bar or standard 7 having the offset knuckle portions 8 for engaging with the hooks or pintle members 5 and carries therewith a pair of gate elevating and supporting links 9 and 10 respectively, the former being pivotally connected with the bar as at $9^a$ while the latter is pivotally connected with the lower end thereof as at $10^a$. The opposite ends of the links 9 and 10 pivotally connect with the frame part 6 of the gate, and as shown the said links 9 and 10 preferably consist of a pair of members for engaging both sides of the gate, thereby strengthening and stabilizing the entire supporting unit. Furthermore, it will be observed that the upper link 9 is slightly longer than the lower link to provide clearance for elevating the gate from its closed position, and to also serve in assisting the retaining of the gate in its elevated position. That is to say the particular arrangement of the links 9 and 10 shown has a camming effect, whereby when the gate is elevated and the frame part 6 abuts against the bar 7 the pivotal connections $9^b$ and $10^b$ of the links with the frame part will be thrown slightly past center, that is the vertical plane of the bar 7, whereby the entire gate with the assistance of the tensioning device D may be held in an elevated position without manual attention.

This tensioning device D essentially consists of the levers 12 and 13 connected as at 14 and respectively connected as at 15 with the bar 7 and as at 16 with the upper frame bar of the gate. The intermediate portion of the lever 13 is engaged by a relatively stout spring 17, and the tension of said spring is in turn controlled by a rod 18 having an adjustment nut 19 abutting against the upright frame part of the gate. Obviously, varying the position of the nut varies the tension of the said spring.

Figure 2:
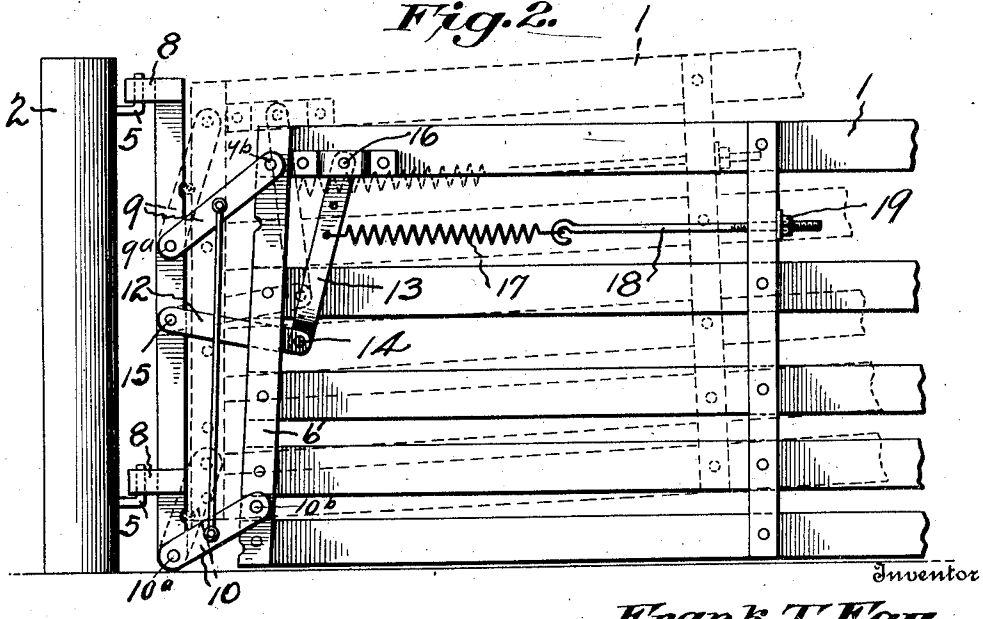
Fig. 2 is an enlarged detail view of the gate supporting and operating mechanism, the same being shown in lowered position in full lines and in elevated position in dotted lines.

The tension of the spring 17 has the effect of counterbalancing the weight of the gate to thereby render the lifting or elevating thereof a simple and easy operation. When the gate is in its lowered position the spring 17 is under maximum tension and the arrangement of the levers 12 and 13 is such that upon the gate being slightly lifted, it will automatically travel to an elevated position due to the pulling effect of the spring. In other words since the gate is relatively free to swing upwardly on the links 9 and 10, and the pivot 14 represents a relatively fixed fulcrum for the lever 13, the upper end of said lever 13 will have a pulling effect on the frame of the gate since its upper end is pivotally connected thereto as at 16. Obviously, when the point of pivotal connection 16 passes the center of the pivot 14 on the elevating movement of the gate, the latter will be forced over into contact with the bar 7 to thereby leave the entire gate elevated and in a slightly inclined position as shown by the dotted lines in Fig. 2. When it is desired to close the gate it is only necessary to bring it into position to engage with the gate post 3 and bear down on the same to overcome the effect of the spring 17 sufficiently to bring the pivots 14 and 16 out of line, whereupon the weight of the gate itself will then automatically cause the same to proceed to its lowermost position by gravity.

From the foregoing it is believed that the features and advantages of the invention are clearly apparent, and it will of course be understood that changes in the form, proportion and details of construction may be resorted to without departing from the spirit of the invention or scope of the appended claims.

I claim:—

1. A gate supporting and elevating device including a bar, elevating links connecting the bar and the gate, and a gate control device including levers pivotally connected with the gate and bar and having a pivotal fulcruming connection therebetween, and a spring connected with one of the said levers for placing the control device under tension.

2. A gate supporting and elevating device including a bar, elevating links pivotally connecting the bar and gate, and a tensioning device including a pair of substantially right angularly disposed lever elements pivotally connected to each other and also pivotally connected with the gate and the bar, and a tensioning spring attached to the lever connected with the gate, and said spring being also connected with the gate.

3. A gate supporting and elevating device including a bar, elevating links of different length pivotally connecting the bar with the gate, and a tensioning device for overcoming the weight of the gate and automatically elevating the same consisting of a lever connected with the bar, another lever pivotally connected with the gate at one end and having its opposite end pivotally attached to the lever connected with the bar to thereby provide a relatively fixed fulcrum point for the gate lever, a spring having one end connected with an intermediate portion of the gate lever, and an adjustable rod connecting with one end of the spring and with the gate.

4. A gate supporting and elevating device including a knuckle bar, elevating links of different length pivotally connecting the bar with one end of the gate, and a tensioning device including a lever connected with the bar and projecting therefrom in a substantially horizontal plane, a shiftable lever pivotally connected at one end with the gate while its opposite end has a relatively fixed fulcrum connection with the lever projecting from the bar, and an adjustable tension spring connected with the lever attached to the gate and serving to counterbalance the weight of said gate as the same is swung on the links.

5. A gate supporting and elevating device including a bar, elevating links connecting the bar and the gate, and a control device for maintaining the gate in an elevated position including a spring tensioned lever pivotally connected with the gate at one end, and another lever pivotally connected at one end with the bar and having at its other end a pivotal fulcruming connection with the said spring tensioned lever.

In testimony whereof I hereunto affix my signature in the presence of two witnesses.

FRANK T. FAY.

Witnesses:

FRED C. SHETLER,

FRANK SWANSON.